United States Patent [19]
Chaouche et al.

[11] Patent Number: 5,862,789
[45] Date of Patent: Jan. 26, 1999

[54] APPLIED IGNITION INTERNAL COMBUSTION ENGINE WHOSE PISTONS HAVE ELLIPTICAL RECESSES

[75] Inventors: Ali Chaouche, Paris; Stëphane Henriot, Saint-Maurice; Gaëtan Monnier, Rueil-Malmaison, all of France

[73] Assignee: Institute Francais de Petrole, Rueil-Malmaison, France

[21] Appl. No.: 838,829

[22] Filed: Apr. 10, 1997

[51] Int. Cl.$^6$ .................................................. F02B 23/06
[52] U.S. Cl. ..................... 123/279; 123/276; 123/285
[58] Field of Search .................... 123/276, 279, 123/285

[56] References Cited

U.S. PATENT DOCUMENTS 5,351,665  10/1994  Kapus et al. ............................. 123/276

FOREIGN PATENT DOCUMENTS

| 2365697 | 4/1978 | France . | |
| 547294 | 8/1956 | Italy ........................................ | 123/276 |
| 53-16107 | 2/1978 | Japan ..................................... | 123/276 |
| 2084696 | 4/1982 | United Kingdom . | |
| 2106592 | 4/1983 | United Kingdom . | |

OTHER PUBLICATIONS

Patent Abstracts Of Japan, vol. 009, No. 282 (M–428), Nov. 9, 1985.
Patent Abstract Of Japan, vol. 015, No. 432 (M–1175), Nov. 5, 1991.

*Primary Examiner*—Tony M. Argenbright
*Attorney, Agent, or Firm*—Antonelli, Terry, Stout & Kraus, LLP

[57] ABSTRACT

The present invention relates to an applied ignition internal combustion engine having at least one cylinder in which a piston slides along the cylinder axis, with a cylinder head capping the cylinder and, together with the piston and cylinder, defining a combustion chamber. The piston has a recess open toward the cylinder head, the recess having several shapes of an ellipsoid section along a transverse plane of the piston, of which the main axis and generatrices are substantially parallel to the lengthwise axis of the piston in order to reduce the area-volume ratios in the combustion chamber and increase turbulence levels at the end of the compression cycle. The ellipse or ellipses is or are such that:

1) $0 < \lambda < 0.6$ with $$\lambda = \frac{G_R - P_R}{G_R + P_R}$$

where $G_R$ is the major radius of at least one of the spaces $P_R$ is the minor radius of the space or spaces.

9 Claims, 3 Drawing Sheets

APPLIED IGNITION INTERNAL COMBUSTION ENGINE WHOSE PISTONS HAVE ELLIPTICAL RECESSES

BACKGROUND OF THE INVENTION

1. Field of the Invention

The present invention relates to the field of applied ignition internal combustion engine. Specifically, the present invention relates to at least one cylinder in which a piston slides along the cylinder axis, with a cylinder head Capping the cylinder and, together with the piston and cylinder, defining a combustion chamber, the piston having a recess open toward the cylinder head. Engines of the aforementioned type that operate on a lean mixture are particularly the subject of the invention.

2. Description of the Prior Art

Advantageously, applied ignition engines operating on a highly dilute mixture (richness of the mixture less than 0.6 for example) considerably reduce pollutant emissions such as nitrogen oxides ($NO_x$).

However, this technology may raise problems linked to flame initiation and propagation which result in combustion instabilities and increased levels of unburned hydrocarbons.

An engine manufacturer familiar with this type of engine must thus pay special attention to the quality of combustion which must be rapid and stable to reduce $NO_x$ emissions while increasing the energy efficiency of the engine.

Combustion characteristics depend on geometric factors (shape of chamber, shape of recess in piston, position of spark plug, and position of intake system) and aerodynamic factors (turbulence and speed), distribution factors, etc.

Optimization of the internal aerodynamics proves to be an important step in the design of an applied ignition engine operating on a lean mixture. The design of the internal aerodynamics in the chamber at the time of ignition must contribute to increasing combustion rates and favoring stability of the flame upon ignition. The flow characteristics at this time in the chamber depend on the result of the interaction between the post-intake aerodynamics and the shape of the combustion chamber. The turbulence levels and rates must in particular be optimized to favor ignition stability and flame propagation in the chamber.

Various geometries have been recently developed, particularly of the recess formed in the piston itself Thus, U.S. Pat. No. 5,351,665 describes a combustion chamber formed in the piston by a recess with a particular geometry.

Document French Patent 2 713 282 discloses another geometry of the recess formed in the upper part of the piston.

SUMMARY OF THE INVENTION

The present application endeavors to meet the aerodynamic objectives listed above to contribute to optimizing the energy efficiency/emissions compromise.

The invention optimizes turbulence and speed levels near the spark plug since too high a turbulence level increases cyclic instability.

Another objective of the invention is to maximize mean turbulence levels in the chamber using in particular the interaction between the chamber shape and swirling around the cylinder axis to generate turbulence.

In particular, the main problem is to prevent excessive gas flowrates at the time of ignition as these rates can affect combustion quality.

The recess of the piston, open toward the cylinder head, has at least one space with an ellipsoid section along a transverse plane of the piston whose main axis and generatrices are essentially parallel to the lengthwise axis of the piston in order to reduce the ratios between area and volume in the combustion chamber and optimize turbulence levels at the end of the compression cycle.

According to the invention, the ellipses are such that 0 <$\lambda$<0.6 with $$\lambda = \frac{G_R - P_R}{G_R + P_R}$$

where $G_R$ is the major radius of at least one of the spaces and $P_R$ is the minor radius of said space or spaces.

More specifically, the recess has two spaces having the following characteristics:

depth $P_B$>0.15×B;

major radius $G_R$ is such that: 0.25×B<$G_R$<0.40×B;

minor radius $P_R$ is such that: 0.10×B<$P_R$<0.25×B with

B being the bore of the cylinder.

In particular, according to the invention, the position of the spaces is such that, with $C_i$ being the center of symmetry of each ellipse and $D_i$ being the distance between the cylinder axis and the center $C_i$ of each ellipse: 0<$D_i$<0.20 B.

Without departing from the invention, the angle ($\alpha$) between the major axes of each ellipse can be 0.

According to another embodiment of the invention, the angle ($\alpha$) between the major axes of each ellipse can be substantially equal to 90°.

In summary, the invention relates to the design of an internal combustion engine, whose cylinder head may or may not be flat, that can be used in a lean mixture with natural gas with a better compromise between energy efficiency and pollution emission than current technologies.

The invention relates to the development of recess geometries in the piston that allow high turbulence levels to be developed at the end of compression. These geometries were created from internal aerodynamic analysis and are based on specific elliptical shapes. These shapes contribute to reducing the area/volume ratios in chambers and hence reducing heat transfers while improving energy efficiency. In addition, these geometries increase turbulence levels at the end of compression by breaking up the flow coming from the intake. This optimizes the combustion characteristics. The judicious disposition of the ellipses of which the recess in the piston is made yields the aerodynamics most favorable to realizing our objectives during the compression phase, taking into account constraints linked to manufacture of the parts.

Thus it is possible to convert existing engines by giving them chamber geometries and in particular piston geometries as disclosed. High-power Diesel engines can be modified according to the invention to operate on natural gas with very low pollution emissions (particularly of $NO_x$ and $CO_2$) associated with an efficiency comparable to that of a direct-injection Diesel engine.

BRIEF DESCRIPTION OF THE DRAWINGS

Other characteristics, details, and advantages of the present invention will emerge on reading the description hereinbelow, provided illustratively and not limitively with reference to the attached figures wherein.

DESCRIPTION OF THE PREFERRED EMBODIMENTS

Figure 1:
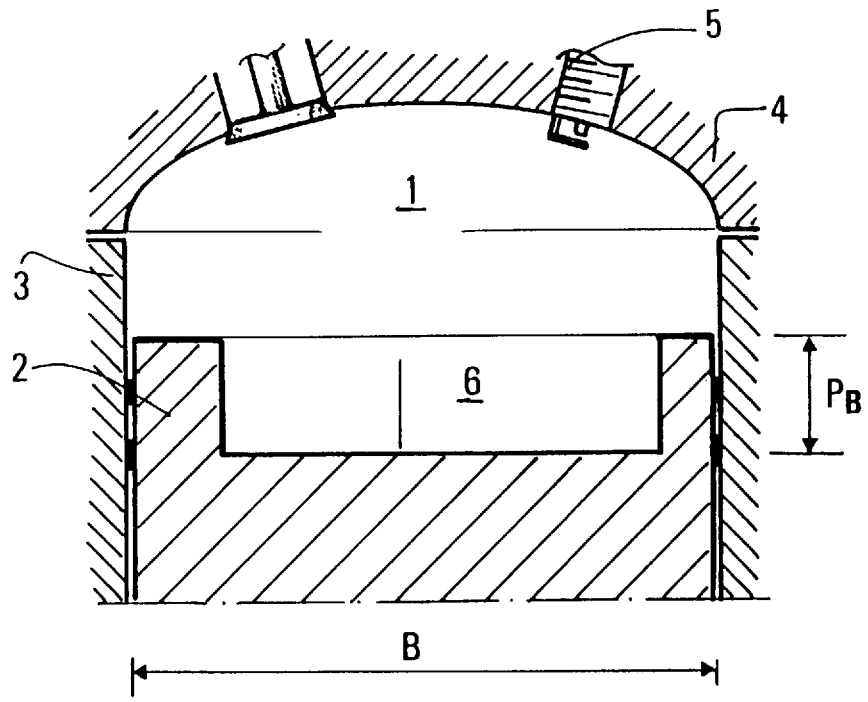
FIG. 1 shows in lengthwise section an internal combustion engine with a chamber according to the invention.

FIG. 1 illustrates in lengthwise section the combustion chamber 1 of an applied ignition internal combustion engine according to the invention.

The combustion chamber is defined by a piston 2 which slides lengthwise in cylinder 3 and by a cylinder head 4 which in the normal fashion has a spark plug 5 and one or more openings (not shown) for intake and exhaust. Piston 2 has a recess of a specific shape.

Recess 6 is open towards cylinder head 4 and is in the form of at least one space with an ellipsoid section containing ellipses along a transverse plane of the piston. In addition, the main axis of the at least one space is substantially parallel to the lengthwise axis of the cylinder. The generatrices of recess 6 are essentially parallel to the lengthwise axis and hence to the walls of the cylinder.

According to the invention, the ellipses have a flat portion $\lambda$ such that $$\lambda = \frac{G_R - P_R}{G_R + P_R}$$

where $G_R$ is the major radius the ellipses of the at least one space and $P_R$ is the minor radius of the ellipses of the at least one space.

This characteristic is very important for obtaining the effects referred to hereinbelow particularly in terms of internal aerodynamics and heat transfers, while otherwise respecting geometric constraints.

When $\lambda=0$, $G_R=P_R$ giving a circle which in fact is a special case of an ellipse. This corresponds to the case where $G_R=P_R=0.25$ B.

When $\lambda=0.6$, the ellipse is flattened, corresponding to the extreme case where $G_R=0.4$ B and where $P_R=0.1$ B.

These values mark the geometric boundaries to which the invention applies. Within the range defined by these boundaries, the invention allows in particular the improvements listed below.

Figure 2:
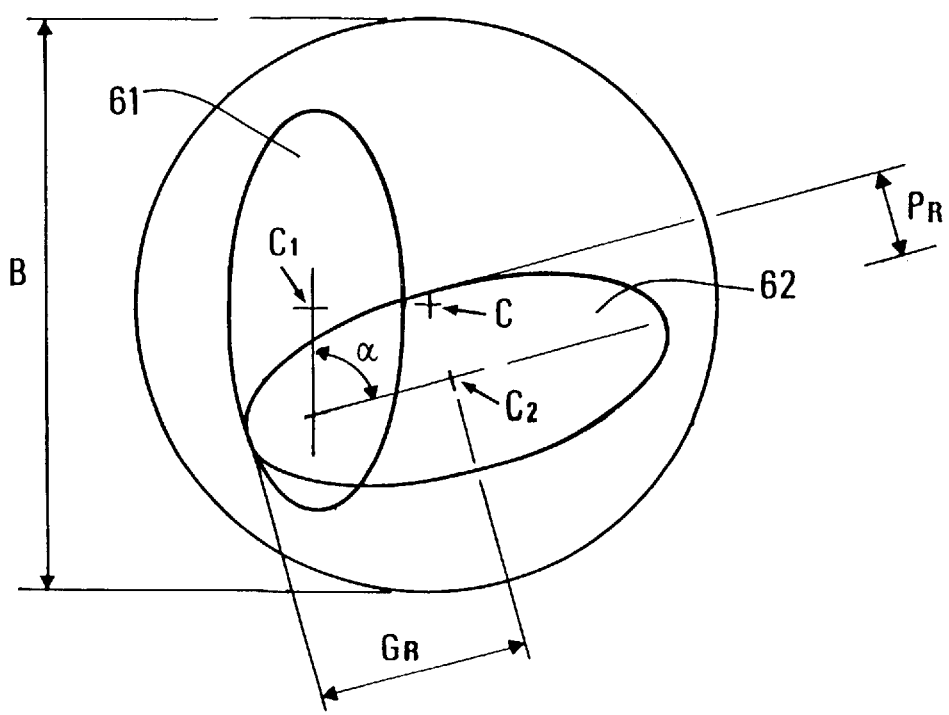
FIG. 2 is a top view of a piston with a recess according to the invention.

Preferably, according to the invention, recess 6 has two ellipsoid spaces 61, 62 as shown in FIG. 2. The depth $P_B$ of each space is greater than 15% of bore B of the cylinder.

In addition, major radius $G_R$ of each ellipse is between 0.25 and 0.40 times the bore B of the cylinder: 0.25 B<$G_R$<0.40 B.

The minor radius $P_R$ of each ellipse is preferably between 0.10 and 0.25 times the bore B of the cylinder: 0.10 B<$P_R$<0.25 B.

The major radius is substantially equal to half the major axis of the ellipse and the minor radius is equal to half the minor axis of the ellipse.

According to another characteristic of the invention, the centers of symmetry $C_i$ of the ellipses (here $C_1$ and $C_2$) are located at a distance from center C of the bore that is less than 0.20 times the value of bore B.

The angle $\alpha$ between the major axes of each space can be any angle.

Figure 3:
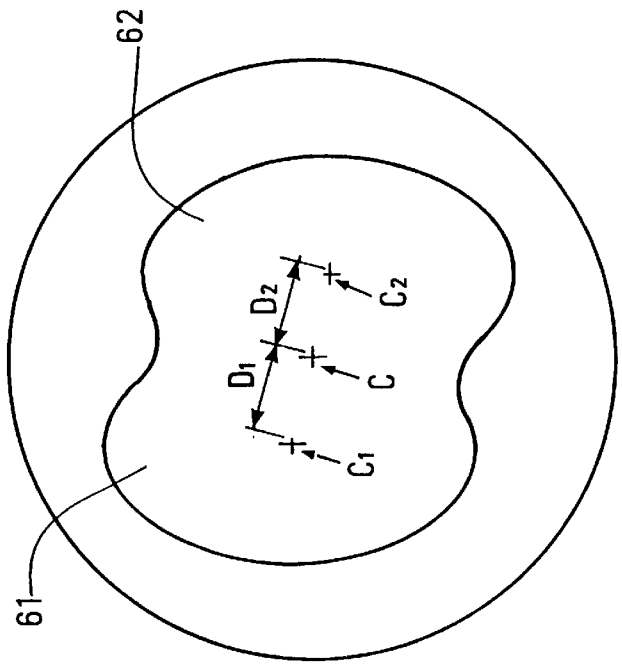
FIG. 3 is a top view and FIG. 3A a cross-section of the piston with a particular recess according to the invention.

FIG. 3 shows an embodiment of the invention according to which the major axes of the ellipses are perpendicular to each other. For illustration, bore B of the cylinder in this case is equal to 120 mm, major radius $G_R$ of each space is equal to 40 mm, and minor radius $P_R$ is equal to 24 mm. Center $C_1$ is equated with center C of the cylinder while center $C_2$ of the second space is located at a distance of 5.4 mm from center C.

Figure 3A:
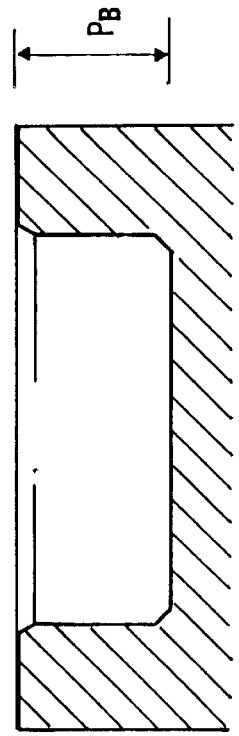

FIG. 3A (lengthwise section) shows more precisely how recess 6 whose generatrices are parallel to the piston axis is designed. In other words, the cross sections are equal whatever the depth of the recess. However the base and top of recess 6 has small variations in cross section due to manufacturing constraints.

Figure 4:
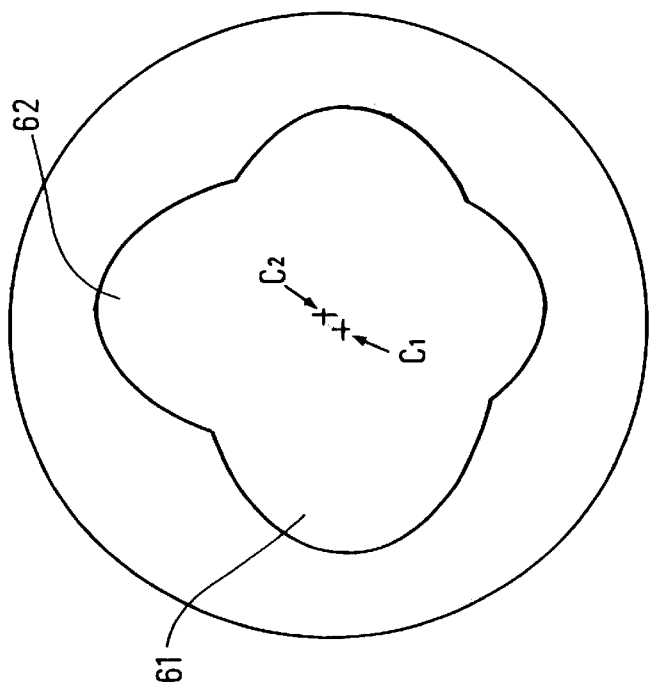
FIG. 4 is a top view and FIG. 4A a cross-section of the piston with a recess according to another embodiment of the invention.
Figure 4A:
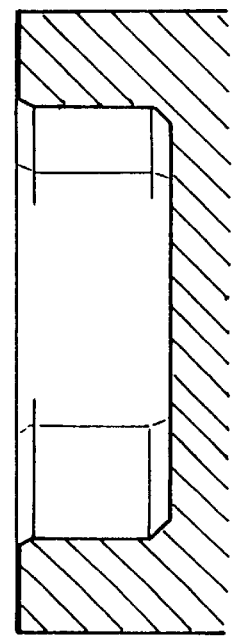

FIG. 4 illustrates another embodiment of the invention where recess 6 has two spaces with an ellipsoid cross section, of which the major axes of the ellipses are substantially parallel with each other. According to this illustration of the invention, bore B is equal to 120 mm, major radius $G_R$ of each ellipse is equal to 40 mm, minor radius $P_R$ of each ellipse is equal to 24 mm, and centers of symmetry $C_1$ and $C_2$ of each ellipse are each 12 mm from center C of bore B. The other details of this geometry can be seen in FIG. 4A and are similar to those provided in relation to FIG. 3A.

The precise position of each of centers C1 and C2 is chosen to accentuate the offcentering effect relative to the axis of the combustion chamber while taking certain dimensional constraints into account.

The embodiments described above were tested on an engine test bench for a heavy vehicle engine operating on a lean mixture, with methane. The results obtained with these chamber geometries enabled $NO_x$ emissions to be reduced to less than 1 g/KWH while maintaining a maximum effective efficiency of approximately 40%, which is close to the efficiency of the pollution-controlled direct-injection Diesel engine.

Figure 5:
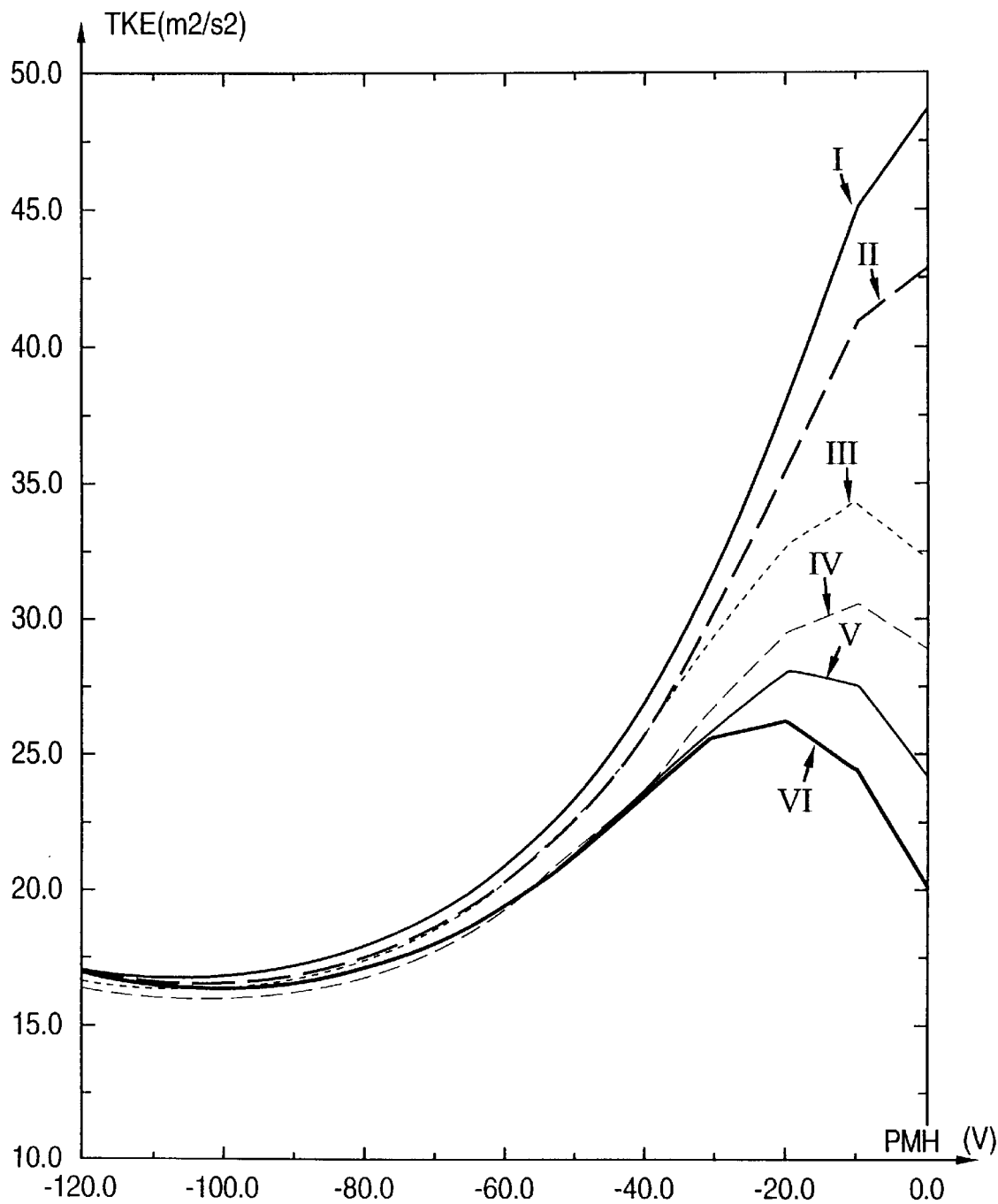
FIG. 5 shows mean turbulent kinetic energy curves as a function of crankshaft angle, obtained for different piston recess geometries.

FIG. 5 illustrates the improvement of the invention in terms of the turbulence created in the combustion chamber.

Curves I and II represent respectively the mean turbulence kinetic energy (TKE) as a function of crankshaft angle in a chamber according to FIG. 4 and according to FIG. 3.

The other curves relate to turbulence kinetic energy for recess geometries not according to the invention.

Curve III is for a cylinder-shaped recess off-center with respect to the spark plug;

Curve IV shows the performance of a cylindrical recess centered around the spark plug;

Curve V illustrates the turbulence created by a frustro-conical recess; and finally Curve VI relates to an essentially spherical recess; it corresponds to a known geometry used in Diesel engines.

These various recess geometries show the differences in turbulence particularly at the end of compression since with geometries according to the invention, turbulent kinetic energies of between 42 and 50 $m^2/s^2$ are attained whereas with the other geometries (curves III to VI), these same energies remain less than 30 $m^2/s^2$.

Advantageously, the increase in turbulence levels in the combustion chamber was obtained during the compression phase by "transforming" the vortex flow coming from the intake.

We claim:

1. An ignition internal combustion engine comprising:
   at least one cylinder in which a piston slides along a cylinder axis, with a cylinder head capping the cylinder and, together with the piston and cylinder, defining a combustion chamber, the piston having a recess open toward the cylinder head defining at least one space, the at least one space having an ellipsoid section along a transverse plane of the piston, of which a main axis and generatrices are substantially parallel to a lengthwise axis of the piston in order to reduce area-volume ratios in the combustion chamber and to increase turbulence levels at an end of a compression cycle, with the ellipsoid section having an ellipse such that $0<\lambda<0.6$ with $$\lambda = \frac{G_R - P_R}{G_R + P_R}$$

where $G_R$ is a major radius of the ellipse and $P_R$ is a minor radius of the ellipse.

2. An engine in accordance with claim 1 wherein:
the ellipsoid section has a pair of ellipses such that $0<\lambda<0.6$ with $$\lambda = \frac{G_R - P_R}{G_R + P_R}$$

where $G_R$ is a major radius of the ellipses and $P_R$ is a minor radius of the ellipses.

3. An engine according to claim 2 wherein:
the recess has two spaces having the characteristics:
depth $P_B > 0.15 \times B$;
the major radius $G_R$ is such that: $0.25 \times B < G_R < 0.40 \times B$;
the minor radius $P_R$ is such that: $0.10 \times B < P_R < 0.25 \times B$; and
B is a bore of the cylinder.

4. An engine according to claim 1, wherein:
a position of the at least one space is such that, with $C_i$ being a center of symmetry of the ellipsoid section and $D_i$ being the distance between the cylinder axis and $C_i$ of the ellipse: $0 < D_i < 0.20$ B.

5. An engine according to claim 2, wherein:
a position of the at least one space is such that, with $C_i$ being a center of symmetry of the ellipsoid section and $D_i$ being the distance between the cylinder axis and $C_i$ of the ellipses: $0 < D_i < 0.20$ B.

6. An engine according to claim 2 wherein:
an angle ($\alpha$) between the major axes of the ellipses is zero.

7. An engine according to claim 3 wherein:
an angle ($\alpha$) between the major axes of the ellipses is zero.

8. An engine according to claim 2, wherein:
an angle ($\alpha$) between the major axes of the ellipses is substantially equal to 90°.

9. An engine according to claim 3, wherein:
an angle ($\alpha$) between the major axes of the ellipses is substantially equal to 90°.

* * * * *